June 2, 1936.  H. A. ZAHL  2,042,490

ALTIMETER FOR AIRCRAFT

Filed Aug. 28, 1933  2 Sheets-Sheet 1

INVENTOR
HAROLD A. ZAHL
BY Francis H. Vanderwerker
Charles A. Rowe
ATTORNEYS

June 2, 1936.  H. A. ZAHL  2,042,490
ALTIMETER FOR AIRCRAFT
Filed Aug. 28, 1933  2 Sheets-Sheet 2
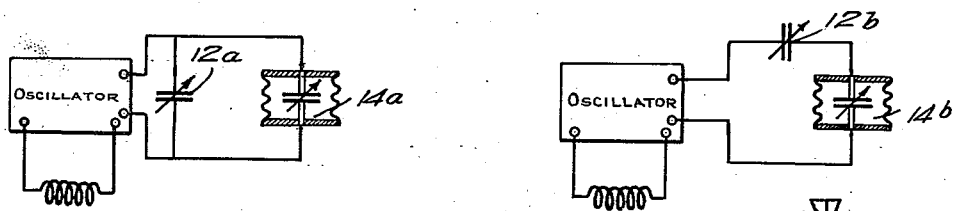
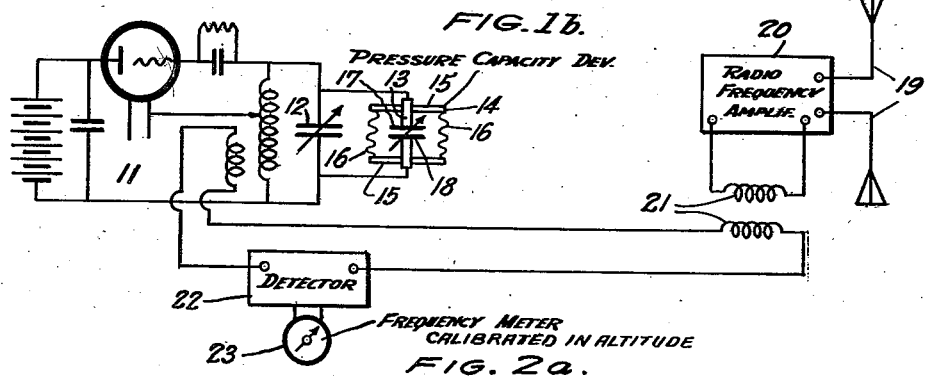
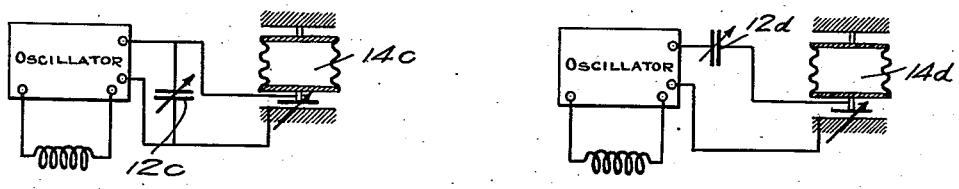
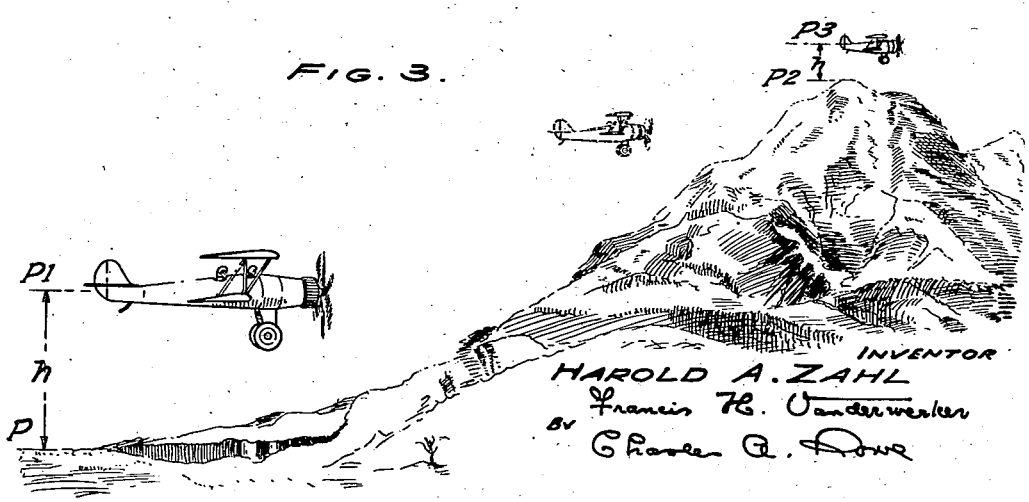

Patented June 2, 1936

2,042,490

UNITED STATES PATENT OFFICE 2,042,490

ALTIMETER FOR AIRCRAFT

Harold A. Zahl, Long Branch, N. J.

Application August 28, 1933, Serial No. 687,157

5 Claims. (Cl. 250—1)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates broadly to means for determining altitude, and more particularly for determining the altitude of aerial bodies.

More specifically the invention relates to altimeters for aircraft and proposes an apparatus of this class which will give a true indication of the height of the craft above the ground or terrain over which the craft is moving, rather than merely its height above sea level.

An important object of the invention is to give accurate indication of the altitude of the body or craft above a ground level, or above an elevated point, where either the ground level or the elevation is to be regarded as a point of reference. Thus, it is an object of the invention to warn the pilot of the approach of an obstruction such as a mountain or the like.

Another object is to provide means for determination of altitude with sufficient accuracy to permit the pilot to make a blind landing with the aid of ground equipment with which the altimeter is coordinated.

Instruments of the usual form which depend upon some type of aneroid barometer have a number of serious limitations which prevent determination of low altitudes in blind landings. These limitations arise chiefly from errors due to "creeping" and hysteresis by reason of the rather large amplitude of movement required to produce the necessary needle deflection.

While the present invention is based in part upon the principle of the aneroid barometer, the limitations of the latter are avoided by utilizing an electrical system and radio method whereby the instrument carried by the craft is coordinated with equipment on the landing field, or other point of reference, which makes it unnecessary to correct for fluctuations of atmospheric pressure at different places. Thus, in substituting electrical methods for mechanical pressure indication, certain refinements in apparatus are possible and while altitude is determined by the differential of pressure between the craft and ground, or any given reference point or level, errors usually associated with the aneroid barometer may be largely eliminated.

The invention consists in the features of construction, mode of operation and in the combination and arrangement of parts hereinafter more fully described, and illustrated in the accompanying drawings, in which:

Fig. 1b shows in detail the actual tuning circuit of an oscillator under the control of a pressure capacity device;

Fig. 2 shows in operative relation with an oscillator a form of pressure-capacity device in which the capacity varies directly as the pressure;

Fig. 2a shows in similar relation another form of pressure-capacity device in which the capacity varies inversely as the pressure; and Fig. 3 is a perspective view to show how the pressure differential may be translated into altitude between the aircraft and a low level on the one hand, or an elevation on the other.

Figure 1:
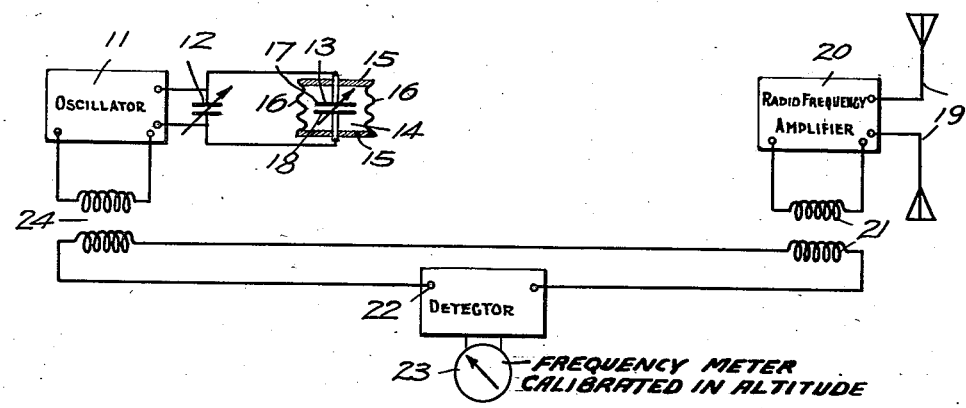
Fig. 1 depicts schematically that part of the apparatus installed in the aircraft.
Figure 1A:
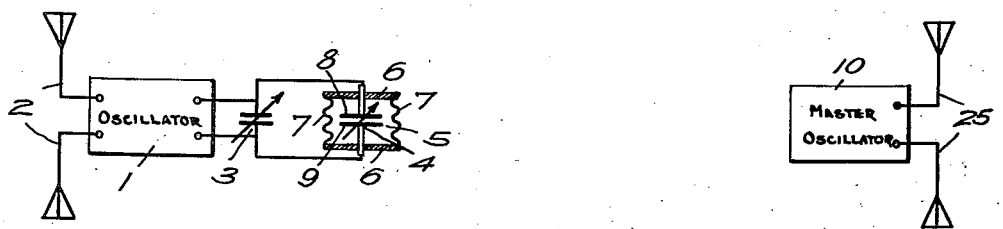
Fig. 1a shows the installation located at ground level, or other predetermined point of reference, and coordinated for operation with the apparatus of Fig. 1.

Referring to Fig. 1 and Fig. 1a, the numeral 1 designates a self-excited oscillator or transmitter of radio wave energy which may be referred to as a ground oscillator and which may be located at a landing field, or at any point to be regarded as a point of reference for coordination with a corresponding oscillator located on an aircraft. The said oscillator is adapted to generate high frequency wave energy which is radiated by antenna system 2. The frequency of oscillator 1 is controlled by a suitable inductance (not shown) in a suitable circuit system and by variable capacities 3 and 4, the variable capacity 4 being one element of a pressure-capacity device generally designated by the numeral 5. Said device is responsive to fluctuations in atmospheric pressure and as here shown may take the form of a vacuum box, that is to say, a hollow fluid-tight body which may be partially evacuated and is designed to be sensitively responsive to changes in barometric pressure. For this purpose, the said body comprises rigid end walls 6 and corrugated flexible side walls 7, forming or encompassing a chamber and the side walls being adapted by their expansion and contraction to respond to pressure variations. Variable capacity 4 is contained in said chamber, the movable plates 8 and 9 of the condenser being suitably secured to the rigid end walls 6. The variable capacity is connected in circuit relation with the oscillator 1. Changes in the external barometric pressure will vary the distance separation of plates 8 and 9 of condenser 4, thereby changing the capacity of the unit and in turn operating to control the frequency radiated by oscillator 1. The variable capacity 3, here shown connected in parallel with condenser 4 and in operative circuit relation with oscillator 1 may be employed for purposes of adjustment, as will be hereinafter more fully explained. A master oscillator, which may be crystal-controlled, is used for checking the ground oscillator 1 and also for checking and to assist in synchronizing a corresponding oscillator carried by the aircraft, as will more fully appear as the description proceeds.

A similar oscillator 11 is located on the aircraft. The frequency of this oscillator is controlled by a suitable inductance (not shown) and by variable capacities 12 and 13. Capacity 13 is an element of pressure-capacity device 14, which is identical in construction with the corresponding ground component, and comprises rigid end walls 15 and flexible corrugated side walls 16, forming a fluid-tight chamber, the side walls by their expansion and contraction permitting the device to respond to variations of atmospheric pressure precisely as in the instance of pressure-capacity device 5 of the ground component. Capacity 13 is mounted in said chamber and connected in circuit relation with the oscillator 11. Changes in the external atmospheric pressure will vary the distance separation of plates 17 and 18 of condenser 13, thereby changing the capacity of the unit and in turn functioning to control the frequency of oscillator 11. Variable capacity 12 is available for purposes of adjustment or compensation, corresponding in this function to the variable capacity 3 of the ground equipment.

In order to show how the actual tuning circuit of an oscillator is controlled by a pressure capacity device, reference is made to Fig. 1b in which a simple oscillator circuit takes the place of the schematic unit 11 of Fig. 1, the other elements being the same as depicted in said Fig. 1. Any conventional oscillator such as that of Hartley, Colpitts or Meissner may be used. In the present instance, the conventional Hartley circuit is shown by way of example. The pressure capacity device 14 is operatively tied into the tuned circuit whereby the frequency of said circuit is under the control of variable condensers 12 and 13. The function of condensers 12 and 13 is the same as herein fully described. A pick up coil is provided to inductively transfer a portion of the oscillatory currents to the mixer-detector circuit.

The signal from ground oscillator 1 is picked up on the aircraft by the antenna system 19, amplified by radio frequency amplifier 20 and the output energy of said amplifier is then fed through inductively coupled transformer 21 to detector 22, thence to audio frequency meter 23. Similarly the output of the aircraft oscillator 11 is fed through transformer 24 to detector 22. The beat frequency of the ground oscillator 1 and the aircraft oscillator 11 registers on the frequency meter 23. The frequency meter readings may then be translated directly into altitude with the approximation that for any ground pressure the vertical pressure gradient is uniform over the low altitudes involved.

In operation, the master oscillator 10 radiating through its antenna system 25 is available for checking both the ground oscillator 1 and the aircraft oscillator 11. By a simple switching operation the pressure actuated capacity 4 may be removed from the circuit of ground oscillator 1, which may then be exactly synchronized with oscillator 11 by adjusting variable condenser 3. Similarly, the aircraft operator removes pressure actuated capacity 13 from the circuit and by means of variable capacity 12 adjusts oscillator 11 to the frequency of master oscillator 10. When the pressure actuated capacities 4 and 13 are again connected in their respective circuits, the frequency differentials of oscillators 1 and 11 are then due only to the difference in capacities of condensers 4 and 13, which in turn vary with the respective pressures at the positions of the two instruments. Checking against master oscillator 10 is vital to guard against frequency drift, and the importance of this applies particularly to the aircraft oscillator 11 where errors would be more serious, since precautions to insure stability of the ground oscillator 1 may be taken much more readily.

The method of measuring the beat frequency with a frequency meter is merely one of several available ways of showing altitude. For example, a variable capacity may be used in the circuit of the aircraft oscillator and this capacity varied to maintain zero beat note. The capacity required to maintain zero beat is then translated in terms of altitude. Referring to Fig. 2, pressure-capacity devices 14a and 14b are shown in operative relation with an oscillator in each instance, coupled in parallel and series, respectively, with compensating condensers 12a and 12b. These compensating condensers function in connection with the zero beat method above suggested and are calibrated to read directly in terms of altitude. In the forms shown in Fig. 2, capacity varies directly as the pressure.

Referring to Fig. 2a, pressure-capacity devices 14c and 14d are shown in operative relation with an oscillator in each instance, the pressure responsive capacity in these forms being also coupled in parallel with compensating condensers, 12c and 12d, respectively. As here shown, the relation of the pressure chamber and pressure responsive condensers is such that the capacity varies inversely as the pressure. Carrying out the operation in accordance with the beat method, the compensating condensers 12c and 12d are calibrated to read in terms of altitude. It will be remembered by reference to Fig. 1, that variable condenser 12 is used only for purposes of adjustment and its function as such could be independent of the compensating condensers 12a, 12b, 12c and 12d, although this is not absolutely necessary.

As hereinbefore suggested, the system may be utilized to warn an aircraft pilot against obstructions such as mountains which may be located in the airways. To visualize this application of the system reference may be had to Fig. 3, it being understood that in addition to the apparatus carried by the aircraft pressure-controlled oscillators may be placed on high mountain tops which happen to be in the regularly travelled airways. Similarly a pressure-controlled oscillator would be located in the lowlands. The beat frequency between the pressure-controlled oscillator at point P in the lowlands and a similar oscillator on the plane as at P1 results in a measure of the differential pressure which may be translated into altitude h at that location. Similarly, while passing over the mountain an identically controlled oscillator at position P2 beats with the oscillator at P3 in the plane at that position. To a fair approximation, the differential pressure thus measured may be translated into the height h representing the difference in elevation of the plane and the mountain top. Strategically located oscillators working with plane equipment would serve to advantage in making blind flying safer over mountainous airlanes.

For avoiding obstructions such as mountains, if the apparatus be designed along the lines shown in Fig. 1 and Fig. 1a, the frequency meter 23 would show an elevation which might be plus or minus the difference in elevation between the aircraft and the mountain top oscillator. Such uncertainty may be eliminated in several ways. For example, by slightly increasing the altitude of the craft, the beat frequency would be reduced if the craft were flying at an elevation lower than the mountain top. Similarly, if the craft were higher than the mountain top, the beat frequency would increase with the increase of the craft's altitude. In fact, it would not even be necessary to change the altitude of the plane since capacity 12 in the oscillator circuit of the aircraft's equipment could be varied and the sense of the beat frequency shift would provide the desired information. Where the position of a plane happened to be at an altitude lower than the mountain-top oscillator, then an increase in the capacity of the oscillator circuit of the aircraft should cause an increase in the beat frequency; or if the plane were higher than the mountain, an increase in capacity would cause a decrease in the beat frequency. If the aircraft is so equipped that altitude is read simply by the capacity required to produce zero beat between the ground and the plane oscillators, then an altitude-calibrated variable capacity would preferably be used instead of variable condenser 12 of Fig. 1.

Since the art of maintaining stability of oscillator circuits is now well developed, "warning oscillators" located on mountain tops or other obstructions could be constructed to require only occasional checking. This is further supported by the fact that a pilot is hardly interested in clearing a mountain by only a very few feet, which is the accuracy desirable on the landing field. Since only small power transmitters are required, it would be feasible to have simple battery operated oscillators on tops of mountains located in paths of airways.

It will be apparent that the embodiments here shown by way of example are capable of considerable modification and rearrangement without departing from the spirit and scope of the invention. The invention is applicable not alone to aircraft, but to aerial bodies in general, or to the determination of altitude of any point or object above a given level, regardless of whether or not the point or object is a mobile body.

The forms of pressure-responsive capacity units are merely suggestive for the purposes of the present disclosure and it is obvious that other forms may be substituted. Incidentally, it may be noted that in many cases components and apparatus forming part of the equipment of an aircraft or a given land station may be adapted or utilized as far as practicable for the purposes of the present invention. It is therefore to be understood that modifications and equivalent arrangements are contemplated as fairly may fall within the scope of the invention and as defined by the appended claims.

I claim:—

1. Apparatus for determining the altitude of an aerial body above any given reference level, comprising sources of high frequency wave energy at said body and at said level, respectively; means comprising a separate source of constant high frequency wave energy located at said level for comparing and synchronizing said sources in respect to their normal operating frequencies; means responsive to barometric pressure to control the frequency of each of said sources; means to combine the energy outputs of said sources to produce a beat frequency representing the pressure differential at the position of said body relative to said level; and means comprising a frequency meter energized by said beat frequency and calibrated for translating said frequency in terms of altitude of said body.

2. Apparatus for determining the altitude of an aerial body above any given reference point, comprising a source of high frequency wave energy carried by said body, and a similar source of high frequency wave energy located at said point; means comprising a separate source of constant high frequency located at said point for comparing and synchronizing said first-named sources in respect to their normal operating frequencies; means responsive to barometric pressure at the level of said body to control the frequency of the first energy source; means responsive to barometric pressure at the said reference point to control the frequency of the second energy source; means to combine the energy outputs of said sources to produce a beat frequency representing the pressure differential of said body relative to said point; and means comprising a frequency meter energized by said beat frequency and calibrated for translating said beat frequency in terms of altitude of said body.

3. An altimeter for aircraft, comprising an oscillator of high frequency wave energy carried by said craft; a second oscillator of high frequency wave energy located at ground level; means for synchronizing the said oscillators in respect to their normal operating frequencies; means responsive to barometric pressure and associated with each oscillator to control the frequency outputs thereof; means operative with the oscillator of said craft to collect and coordinate therewith the energy output of said ground oscillator to produce a beat frequency, said beat frequency representing the pressure differential at the position of said craft relative to the ground level; and means comprising a frequency meter energized by said beat frequency and calibrated to translate variations of said beat frequency in terms of altitude of said craft.

4. An apparatus for determining altitude comprising sources of high frequency waves located at different levels; means responsive to barometric pressure at said levels to control the frequency of each of said waves; means for coordinating said waves to produce a resultant wave whose frequency represents the pressure differential between said levels; and a frequency meter energized by said resultant and calibrated to translate the differential frequency in terms of altitude.

5. An apparatus for determining altitude between two different levels, comprising separate oscillators of high frequency waves located at each of said levels, respectively; means comprising a master oscillator of constant frequency output for synchronizing the said oscillators in respect to their normal operating frequencies; means responsive to barometric pressure and associated with each of said first-named oscillators to control the frequency outputs thereof, including a circuit system operative therewith for combining the outputs thereof to produce a beat frequency representing the pressure differential between said levels; and means comprising a frequency meter energized by said beat frequency and calibrated to translate the said beat frequency in terms of altitude.

HAROLD A. ZAHL.